(12) United States Patent
Abate et al.

(10) Patent No.: US 12,466,502 B1
(45) Date of Patent: Nov. 11, 2025

(54) METHOD AND SYSTEM FOR IMPROVING STABILITY IN A LEGGED ROBOT

(71) Applicants: Andrew Abate, Albany, OR (US); Kevin Francis Sweeney, Albany, OR (US)

(72) Inventors: Andrew Abate, Albany, OR (US); Kevin Francis Sweeney, Albany, OR (US)

(73) Assignee: Agility Robotics, Inc., Salem, OR (US)

( * ) Notice: Subject to any disclaimer, the term of this patent is extended or adjusted under 35 U.S.C. 154(b) by 584 days.

(21) Appl. No.: 17/954,498

(22) Filed: Sep. 28, 2022

(51) Int. Cl.
*B62D 57/032* (2006.01)

(52) U.S. Cl.
CPC .................. *B62D 57/032* (2013.01)

(58) Field of Classification Search
CPC ............... B62D 57/032; B25J 17/00
See application file for complete search history.

(56) References Cited

U.S. PATENT DOCUMENTS

| | | | |
|---|---|---|---|
| 9,375,851 B2 * | 6/2016 | Nagatsuka | B25J 17/0266 |
| 9,821,866 B1 * | 11/2017 | Urata | B25J 5/00 |
| 9,994,269 B1 * | 6/2018 | Urata | B62D 57/032 |
| 10,786,414 B2 | 9/2020 | Garrec | |
| 2009/0200090 A1 * | 8/2009 | Takanishi | B25J 19/0004 901/1 |
| 2021/0252697 A1 | 8/2021 | Webb | |
| 2023/0382476 A1 * | 11/2023 | Bicchi | B62D 57/032 |
| 2023/0391410 A1 * | 12/2023 | Hutter | B62D 57/032 |

FOREIGN PATENT DOCUMENTS

KR 101716761 B1 * 9/2015 .......... B25J 9/0006

OTHER PUBLICATIONS

KR-101716761-B1 Machine Translation (Year: 2015).*

* cited by examiner

*Primary Examiner* — Jake Cook

(57) ABSTRACT

A robot has a body and at least two legs extending from the robot body, each leg comprising a plurality of links that are rotatably connected. A ground contacting assembly is rotatably connected to the distal link of each leg. The ground contacting assembly is configured to provide an increase in roll range of motion and to facilitate abduction and adduction of the leg for traversing terrain.

17 Claims, 5 Drawing Sheets

METHOD AND SYSTEM FOR IMPROVING STABILITY IN A LEGGED ROBOT

FIELD OF THE INVENTION

This disclosure relates generally to apparatus, methods, and systems for autonomous robots and vehicles. More specifically, the disclosed subject matter relates to methods and systems that enable improved autonomous legged locomotion as directed to a robot leg and foot configuration for improved robot stance and stability.

BACKGROUND OF THE INVENTION

To be practicable in real-world environments legged robots need to traverse real-world terrain that may be unfamiliar, uneven and unforgiving, all while maintaining both a desired trajectory and robot stability.

Animals are clearly adaptive to their environment, applying compliance of joints, tendons and muscles, and kinematics such as the pitch, roll and rotation of joints and limbs with cognitive feedback for near instantaneous accommodation of physical environmental factors. In order to be adaptive to its environment, robot foot and robot leg elements must provide both a rigid structure for weight bearing while having the structural flexibility to conform and accommodate to non-uniform terrain, and thus provide balance, both static and dynamic, shock absorption, being capable of transferring ground reaction forces, all whilst facilitating the stance and swing of the required gait to traverse terrain.

While significant advances have been made by the development of systems and methods for reduction of footfall impact forces and collisions during foot placement by legged robots, significant improvement in accommodating non-uniform terrain is required. In order to address such environments, a robot step must be improved beyond the configured operational range-of-motion of prior art robots. That is to say that a particular trajectory, step path, and/or level of stability that may be required by a legged robot to traverse a real-world environment may not be safely accessible given the current state of the art.

The ability, therefore, of a robot foot or ground contacting assembly to be flexible in order to broach uneven terrain is critical. For example, the ability for a legged robot to optimize coronal plane placement, by optimizing the roll range of motion of the ground contact assembly to accommodate both leg abduction and adduction, and thereby aid robot stability and balance is an unmet need and addressed herein.

SUMMARY OF THE INVENTION

The following summary is provided to introduce a selection of concepts in a simplified form that are further described below in the detailed description. This summary is not intended to identify key features or essential features of the claimed subject matter, nor is it intended to be used to limit the scope of the claimed subject matter.

Thus, in some embodiments a legged robot for traversing a terrain is disclosed. The legged robot comprises a robot body and at least two legs extending from the robot body wherein each leg comprises a plurality of rotatably connected links comprising at least a proximal link and a distal link and a ground contacting assembly rotatably connected to the distal link of each leg; each ground contacting assembly comprises a first element and a pair of connecting rods; each connecting rod comprises a rod-end and a proximal end, wherein each rod-end comprises a rod-end center and the rod end centers define a horizontal axis through the first element; the rod-ends are rotatably connected to the first element via an angled connector having a central axis, wherein the central axis is oriented at a coronal plane angle in the range of between 5° and 45° relative to the horizontal axis; and the proximal end is connected to the leg, where the ground contacting assembly has a roll a range of motion in the coronal plane for traversing terrain.

In another embodiment of the legged robot, the at least two legs comprise a plurality of links that are rotatably connected in an end to end manner, and in a further embodiment the plurality of links further comprise an intermediate link, and in a still further embodiment, the at least two legs comprises a plurality of joints, such that the joints rotatably connect the plurality of links in an end to end manner. In another embodiment of the legged robot the proximal end of each of the connecting rods is connected to the distal link of each of the robot legs. In other embodiments, the proximal end of each connecting rod is connected to an actuator, and in a further embodiment the actuator is disposed on the robot body, or at least one of the plurality of links of each of the robot legs.

In one embodiment of the legged robot disclosed herein, the angled connector is selected from the group consisting of screws, studs, bolts, and fasteners, and in some embodiments the angled connector is a threaded stud. In some other embodiments, the central axis of the angled connector is oriented at a coronal plane angle of 10° relative to the horizontal axis.

In other embodiments disclosed herein, the ground contacting assembly of the legged robot has a roll range of motion in both the abduction and adduction direction. In some other embodiments the legged robot has a ground contacting assembly that has a roll range of motion that is greater in the abduction direction than the adduction direction. In another embodiment the ground contacting assembly has a roll range of motion of about 55° the coronal plane, and in a further embodiment the ground contacting assembly has a roll range of motion of –35°/+15° in the coronal plane. In some embodiments of the legged robot disclosed herein, the rod-end rotates about 50° relative to the central axis of the angled connector.

In other embodiments disclosed herein, each leg of the legged robot has a roll range of motion in both the abduction and adduction direction. In some other embodiments of the legged robot, each leg has a roll range of motion that is greater in the abduction direction than the adduction direction. In another embodiment of the legged robot, each leg has a roll range of motion of about 55° the coronal plane, and in a further embodiment, each leg has a roll range of motion of –35°/+15° in the coronal plane. In some embodiments of the legged robot disclosed herein, the rod-end rotates about 50° relative to the central axis of the angled connector. In some embodiments, of the legged robot, the angled connector rotatable connects each of the pair of connecting rods to the first element at a first angle and a second angle wherein the first and the second angle are different angles within the range of between 5° and 45° relative to the horizontal axis, such that in some embodiments, each connecting rod is therefore connected to the first element via the angled connector at different angles.

Disclosed herein, in some embodiments is a robot having a body and and at least two legs configured for traversing a terrain, a ground contacting assembly comprising a first element and a pair of connecting rods; each connecting rod comprises a rod-end and a proximal end and each rod-end comprises a rod-end center; the rod end centers define a horizontal axis through the first element, and the rod-ends are rotatably connected to the first element via an angled connector having a central axis; the central axis is oriented at a coronal plane angle in the range of between 5° and 45° relative to the horizontal axis; and proximal end of the connecting rod is connected to the leg; the ground contacting assembly is thus operable to facilitate abduction and adduction of each leg for traversing the terrain. In some other embodiments of the ground contacting assembly the proximal end of the connecting rod is connected to the distal link of each leg, and in a further embodiment of the ground contacting assembly the proximal end of the connecting rod is connected to an actuator. In some embodiments disclosed herein, the pair of connecting rods are rotatably connected to the first element via a pair of angled connectors, each angled connector having a central axis, wherein the central axis is oriented at a coronal plane angle that is in the range of between 5° and 45°, and wherein the coronal plane angle is the same in each of the angled connectors that rotatably connects each connecting rod of the connecting rod pair to the first element. In a further embodiment, the pair of connecting rods are rotatably connected to the first element via a pair of angled connectors, each having a central axis wherein the central axis is oriented at a coronal plane angle that is in the range of between 5° and 45°, wherein the coronal plane angle is different in each of the angled connectors that rotatably connects each connecting rod of the connecting rod pair to the first element.

In some embodiments of the ground contacting assembly disclosed herein, the central axis of the angled connector is oriented at a coronal plane angle of 10° relative to the horizontal axis. In another embodiment of the ground contacting assembly of the ground contacting assembly has a roll range of motion that is greater in the abduction direction than the adduction direction; in another embodiment ground contacting assembly has a roll range of motion of about 55° in the coronal plane, and in a further embodiment the ground contacting assembly has a roll range of motion of −35°/+15° in the coronal plane. In an embodiment of the ground contacting assembly disclosed herein, the rod-end rotates about 50° relative to the central axis of the angled connector, and in a further embodiment the angled connector is a threaded stud.

In some embodiments a legged robot for traversing a terrain is disclosed, wherein the robot comprises a robot body and two legs extending from the robot body; each leg comprises a proximal link, an intermediate link, and a distal link; the proximal link having a first end rotatably connected to the body and a second end rotatably connected to the intermediate link at an intermediate link first end, the intermediate link having an intermediate second end rotatably connected to the distal link at a distal link first end; and a ground contacting assembly rotatably connected to the distal link of each leg; each ground contacting assembly comprises a first element and a pair of connecting rods; each connecting rod comprises a rod-end and a proximal end and each rod-end comprises a rod-end center and the rod end centers define a horizontal axis through the first element, wherein the rod-ends are rotatably connected to the first element via an angled connector having a central axis, wherein the central axis is oriented at a coronal plane angle of 10° relative to the horizontal axis; the proximal end of each connecting rod is connected to the distal link, and the ground contacting assembly is thus operable to facilitate abduction and adduction of each leg of the legged robot for traversing terrain.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

The accompanying drawings, which are incorporated in and form a part of the specification, illustrate the embodiments of the invention and, together with the written description, serve to explain the principles, characteristics, and features of the invention.

In the drawings.

Figure 1:
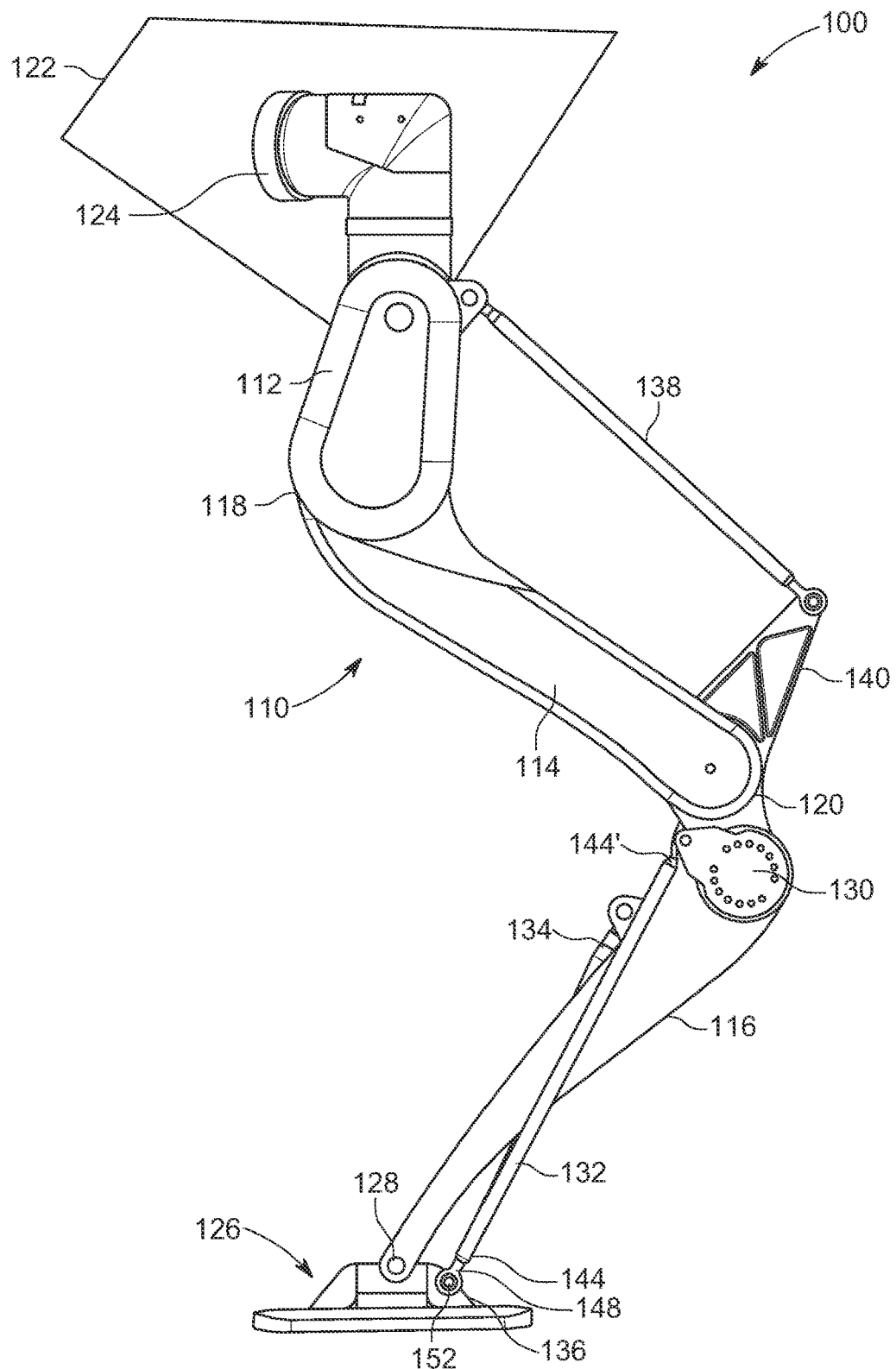
FIG. 1 is an illustration of an embodiment of a robot leg in accordance with the disclosed subject matter.

While implementation of the disclosed inventions are described herein by way of example, those skilled in the art will recognize that they are not limited to the embodiments or drawings described. It should be understood that the drawings and detailed description thereto are not intended to limit implementations to the particular form disclosed, but on the contrary, the intention is to cover all modifications, equivalents, and alternatives falling within the spirit and scope as defined by the appended claims. The headings used herein are not meant to be used to limit the scope of the description or the claims.

DETAILED DESCRIPTION OF THE INVENTION

The following detailed description includes the best currently contemplated modes of carrying out exemplary embodiments of the invention. The description is not to be taken in a limiting sense but is made merely for the purpose of illustrating the general principles of the invention.

In the following description, for purposes of explanation, numerous specific details are set forth in order to provide a thorough understanding of example embodiments. It will be evident to one skilled in the art, however, that embodiments can be practiced without these specific details. In some instances, well-known methods or components have not been described in detail so that the details of the present invention are not differentiated.

In the interest of clarity, some routine features of the implementations described herein are omitted. It will be appreciated that in the development of any actual implementation of the present invention, certain decisions must be made in order to achieve specific goals, and that different decisions can be made to achieve different goals without departing from the teachings of the invention. While certain implementations might be complex and time-consuming, they would nevertheless be routine to accomplish for those of ordinary skill in the art having the benefit of this disclosure.

The disclosure herein, generally relates to embodiments of an apparatus, methods, and systems for an ambulatory legged robot. More specifically, the disclosed subject matter relates to methods and systems that enable improved autonomous legged locomotion as directed to a robot leg and foot configuration, and in even more specific embodiments for improved foot flexibility and roll range of motion, in order to provide improved robot ambulation, stability and stance.

In some embodiments, the disclosed subject matter relates to a robot leg and foot configuration that includes a leg formed from a plurality of links, connected in an end to end manner, and a ground contacting assembly that accommodates an improved range of motion, particularly an improved roll range of motion comprising abduction and adduction of the foot in the coronal plane, and more particularly, improved roll range of motion in the abduction direction of the foot in the coronal plane. In some embodiments a "ground contacting assembly" may be referred to as a "foot assembly" and thus said terms are interchangeable as used herein.

Embodiments of the configuration of the leg and foot disclosed herein improves the ability of a legged robot to accommodate an uneven or non-uniform terrain or environment, while maintaining stability, such that the stability is static or dynamic. In some embodiments, the robot foot may adopt a flat profile or configuration when placed on a non-uniform terrain.

In some embodiments, abduction and adduction is a property of the robot leg, and wherein the foot range of motion is configured to be flat on the non-uniform terrain throughout the robot leg range of motion in the abduction and adduction directions, such that the foot has at least the same range of motion as the leg.

Some features of the leg assembly described herein are disclosed in U.S. Pat. No. 10,189,519 and PCT Patent Publication No. WO 2020/176542 and are incorporated herein by reference in their entirety.

Thus, disclosed herein is a legged robot for traversing a terrain that has a body and at least two legs. Each leg comprises a plurality of links connected end to end, the plurality of links comprising at least a proximal link and a distal link. The proximal link has a first end rotatably connected to the body and a second end distal from the body.

The robot further has a ground contacting assembly or foot assembly, rotatably disposed on a distal end of the distal link of each leg. The ground contacting assembly which comprises at least a first element (which may be referred to and is interchangeable with "a first ground contacting element" and in some embodiments may also be interchangeable with a "toe element") which makes contact with the ground or terrain and generally supports the robot as it walks.

In certain embodiments, the robot further comprises a plurality of actuators, such that a first leg actuator, may be disposed on the body and/or the first link, thus being configured to rotate the proximal link about a first end. A second leg actuator is also disposed on the proximal link and is configured to rotate an adjacent link relative to the first link. In certain embodiments, this second leg actuator extends and retracts the leg along a leg length direction.

In embodiments, the robot still further has at least a first ground contacting assembly actuator, which in some embodiments is a differential actuator which may be mounted on one of the links that is operable upon the ground contacting assembly. The actuator may in some embodiments drive pitch and roll in the first element of the ground contacting assembly.

In some embodiments, the legged robot disclosed herein has a connecting rod connecting the distal link of the leg to the first element of the ground contacting assembly. The connecting rods are high-efficiency connecting rods, that in some embodiments may connect one or more actuators positioned on one of the plurality of links to a second of the plurality of links disclosed herein. Thus, in some embodiments the robot may utilize the connecting rods in a leg configuration that provides a desirable gear ratio or lever arm, to translate torques from electric motors to foot forces as precisely as possible.

Additionally, the connecting rods have a distal-end that terminates in a rod-end. The rod-end comprises a shank with a thread that connects the rod-end to the distal end of the connecting rod. The rod-end further comprises an eyelet shaped housing that accommodates a spherical plain bearing unit, and in such embodiments the rod-end is a spherical rod-end. In some embodiments, the spherical plain bearing unit comprises an inner ring which has a spherical convex outside diameter, while the outer ring has a correspondingly concave inside diameter. The bearing unit can accommodate an angled connector such as a stud, whereby the stud connects the connecting rod to the first element via the rod-end.

In some embodiments, the forces acting on the bearing may be static or may occur when the bearing makes oscillating or recurrent tilting and slewing movements at relatively low speeds, and thus accommodates multi-directional, self-aligning movements, hence allowing the spherical rod-end bearing to accommodate oscillating movements in the first element.

Hence, the connecting rods are connected to the ground contacting assembly in a configuration that allows the roll range of motion of the ground contacting assembly and translates to facilitating control of adduction and more particularly abduction in the coronal plane, thereby increasing the configured operational range of motion of the robot leg and stability of the robot as it traverses terrains of varying topography.

Referring now to FIG. 1 wherein an exemplary robot 100 comprises an exemplary leg 110 for ambulatory legged locomotion. The leg 110 can include a plurality of links, illustrated herein is at least a first, second, and third link 112, 114, and 116, connected to each other by joints 118, 120 and to a body 122 by a joint 124. A hip actuator can be mounted on the robot body 122 for moving the leg 110 forward and backward in relation to the robot body 122. A knee actuator can be disposed on the first link 112 for extending and retracting the leg 110. The hip and knee facilitate the translational motion of the leg 110. The first link may be defined in some embodiments as a proximal link, the second link may be defined in some embodiments as an intermediate link, and the third link may be defined in some embodiments as a distal link.

The first link 112 can be rotatably connected to the second link 114. The second link 114 can be rotatably connected to the third link 116. The first link 112 has opposing first and second ends with the first end being rotatably mounted to the body 122. The third link 116 has a distal end (as used herein the term "proximal" refers to a location closest to the robot body 100, while the term "distal" refers to a location relatively further from the robot body 122, such as connected to the ground contacting assembly 126) having a ground contacting assembly 126 rotatably disposed thereon.

In certain embodiments the plurality of links comprise longitudinal axes. In other embodiments, the ground contacting assembly 126 includes a rotational joint 128 providing a functional connection point between the leg 110 and the ground contacting assembly 126.

In certain other embodiments, one or more foot actuators can be mounted on any of the links 112, 114, or 116 or on the body 122. In certain embodiments, the foot actuator(s) 130 are mounted on the third link 116 with connecting rods 132-134 connecting one or more of the foot actuators 130 to the first element 136.

Further, the legged robot described herein includes a connecting rod 138 that connects the first link 112 with the third link 116 via extension joint 140 to constrain rotation of the third link 116 about joint 120 in the manner of a four-bar linkage, when the knee actuator moves the second link 114.

In some embodiments, leg actuators can include cables and/or transmissions, such as pulleys, and can be configured to rotate and/or control the movement of one or more of the links 112-116. In other embodiments, the actuators disclosed herein can include ball screws and linkages, and in other further embodiments actuators can include a motor and transmission, such as a cycloid transmission or a strain wave gear system.

In some embodiments, foot actuator(s) 130 affect foot angle in the sagittal and coronal planes. The foot actuators are connected to the first element 136 via connecting rods 132-134. In embodiments, the connecting rods 132-134 are positioned on opposing sides of the third link 116, attached in two different locations on the first element 136 in order to control pitch and roll movement of the ground contacting assembly 126. In certain other embodiments, the connecting rods 132-134 can be positioned on opposing sides of the second link 114. FIG. 1 also illustrates the distal end 144 of the connecting rod 132, the proximal end 144' of the connecting rod 132, and the spherical rod-end 148 of the connecting rod 132, which has a rod-end center 152. These elements will be discussed more specifically in further embodiments and in particular by virtue of FIG. 3.

In certain embodiments, the robot 100 can be implemented in a bi-pedal configuration with a second leg that is substantially identical to the leg 110.

Figure 2:
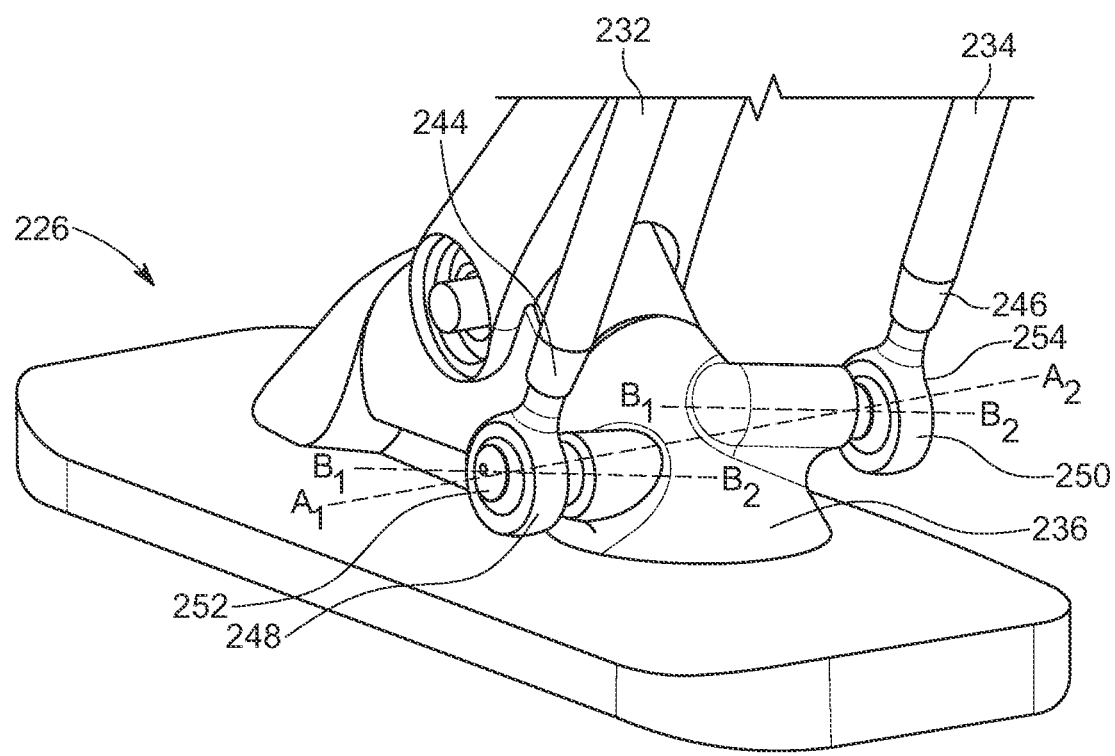
FIG. 2 is an illustration of an embodiment of a robot ground contacting assembly constructed in accordance with certain embodiments of the disclosed subject matter positioned in a "neutral" configuration.

Referring now to FIG. 2, an embodiment of an exemplary ground contacting assembly 226 is provided, such that the ground contacting assembly 226 comprises a first element 236, and connecting rods 232, 234.

In certain embodiments, each of the connecting rods 232-234 has a distal-end 244-246. Each distal-end has a rod-end 248-250 having a rod-end center 252-254. In some embodiments, the rod-end 248-250 is a spherical rod-end.

Each connecting rod 232-234 is rotatably connected at the rod-end center 252-254 to the first element 236 by an angled connector, wherein the central axis of the angled connector (as depicted by the line traversing point B1 and point B2) is oriented at a coronal plane angle in a range of between 5° and 45° to the horizontal axis of the rod end center which is depicted as the horizontal line (A1 through A2) that traverses the rod-end centers 252-254 in the coronal plane of the first element 236.

The angled connector, in some embodiments, is a threaded stud that is received by the spherical rod-end, and connects the spherical rod-end to the first element, while allowing for oscillating movements at low speed. In some embodiments the rod-end may rotate about 50° relative to the central axis of the angled connector.

Further, the proximal-end of each connecting rod is connected to the first ankle joint (not shown). In some embodiments, the central axis of the angled connector (as previously described) is at an angle of 10° relative to the horizontal axis of the rod end centers. The ground contacting assembly 226 is thus operable to provide improved roll of motion range and abduction and adduction in the coronal plane for a legged robot. In one embodiment the ground contacting assembly 226 has a roll range of motion of about 55° in the coronal plane. In another embodiment the ground contacting assembly 226 can display a roll range of motion of −25° to +25° in the coronal plane, in a further embodiment the ground contacting assembly 230 has a roll range of motion of −40° to +10° and in a still further embodiment the ground contacting assembly has a roll range of motion of −35°/+15° in the coronal plane.

In some embodiments the roll range of motion of the food assembly can be about 55° in the coronal plane relative to the plane of the leg.

In some embodiments the leg plane can be defined by the horizontal leg axis and the horizontal roll axis of the ground contacting assembly. In some embodiments the leg plane is the plane spanned by the hip and knee degrees of freedom, and in a further embodiment the leg plane can be defined as the plane, perpendicular to any one of the hip, knee, ankle, or ground contacting assembly pitch axes.

Figure 3:
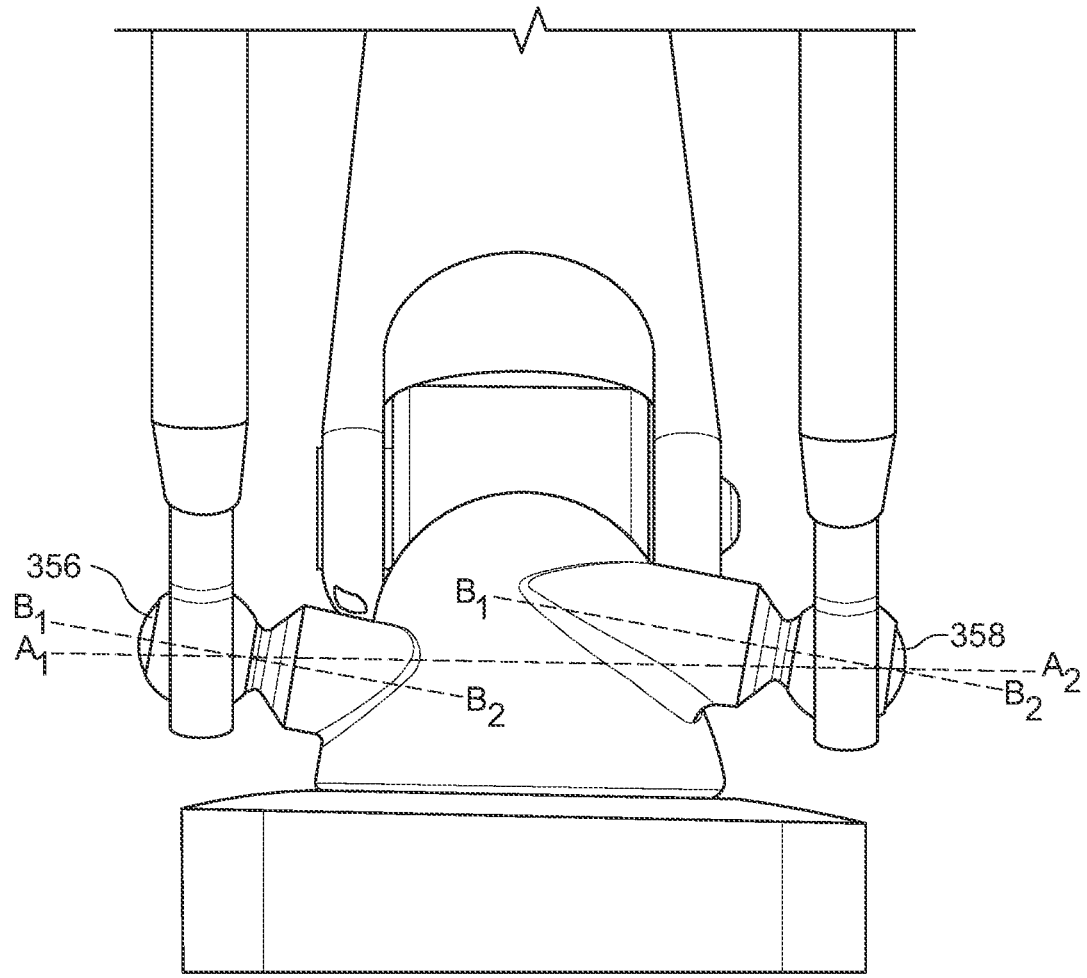
FIG. 3 is an illustration of the robot ground contacting assembly shown in FIG. 2 from a posterior perspective.

FIG. 3, is a further illustration of the robot ground contacting assembly shown in FIG. 2 from a posterior perspective, such that the angled connectors 356-358 are apparent.

Figure 4:
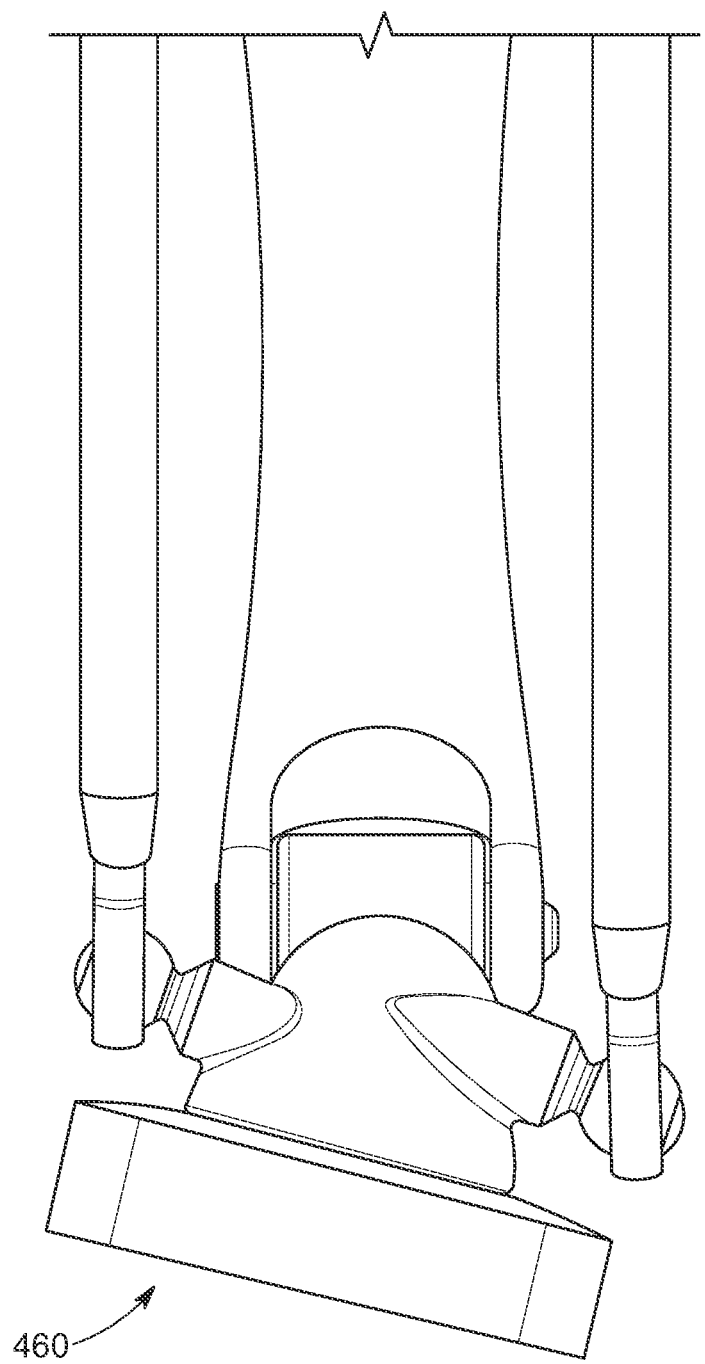
FIG. 4 is an illustration of an embodiment of a robot ground contacting assembly constructed in accordance with certain embodiments of the disclosed subject matter poised in an abduction configuration.
Figure 5:
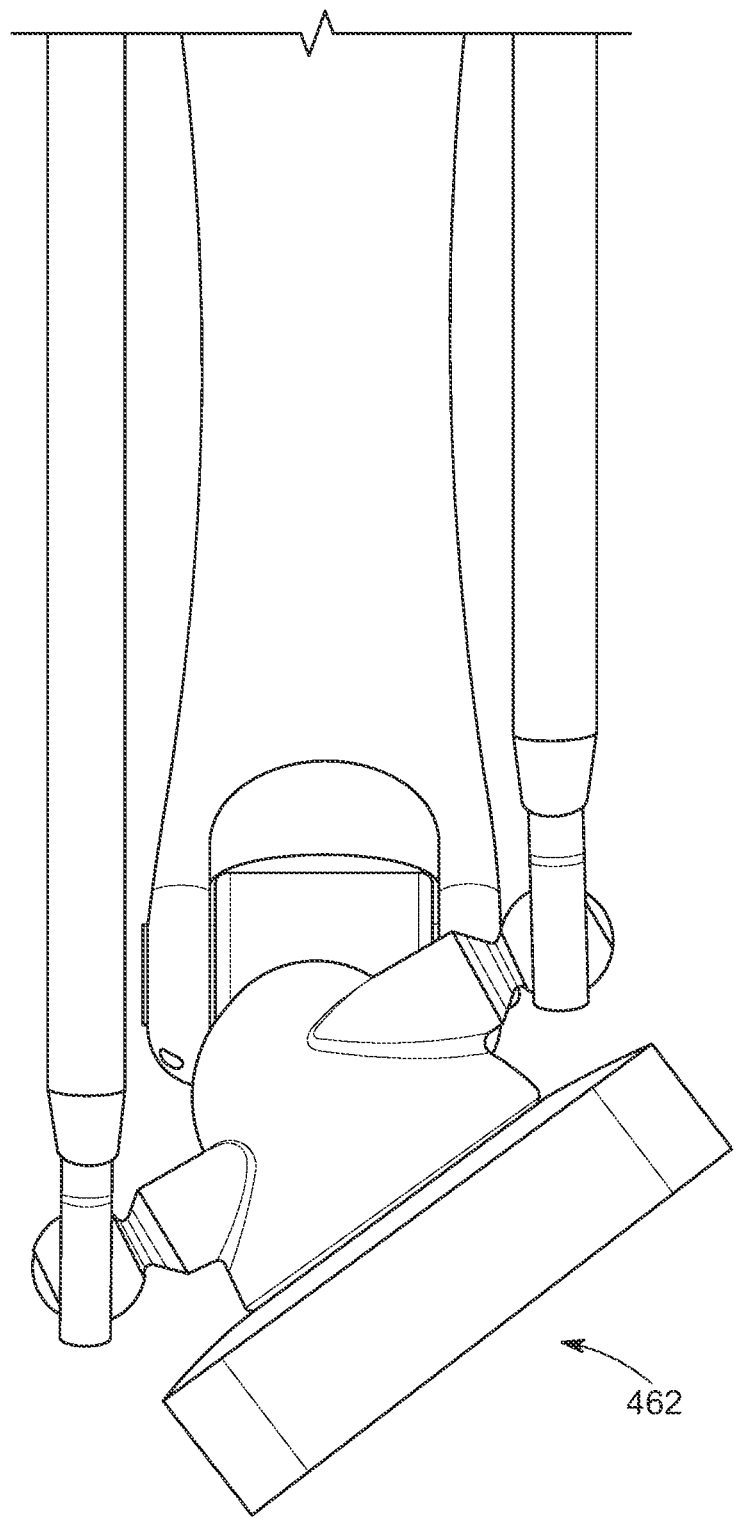
FIG. 5 is an illustration of an embodiment of a robot ground contacting assembly constructed in accordance with certain embodiments of the disclosed subject matter poised in an adduction configuration.

FIG. 4 illustrates an embodiment of ground contacting assembly as previously described, such that the embodiment more particularly illustrates a left foot or left ground contacting assembly of a bipedal robot with a roll range of motion in the abduction direction 460 and FIG. 5 illustrates a left foot or left ground contacting assembly with a roll range of motion in the adduction direction 562. In one embodiment, the ground contacting assembly of FIGS. 4 and 5 has a roll range of motion of about 55° in the coronal plane, and in another embodiment, the ground contacting assembly can display a roll range of motion of −25° to +25° in the coronal plane relative to the leg plane, in a further embodiment the ground contacting assembly has a roll range of motion of −40° to +10° and in a still further embodiment the ground contacting assembly has a roll range of motion of −35°/+15° in the coronal plane relative to the leg plane.

Thus, referring to FIG. 1, FIG. 2, and FIG. 3 where necessary, embodiments of the legged robot and in particular the ground contacting assembly configuration provides methods of increasing the roll range of motion in a legged robot, such that the method comprises providing a robot body 122, and at least two legs 110 extending from the robot body wherein each leg comprises a plurality of links, comprising at least a proximal 112 and distal link 114 and a ground contacting assembly 126 rotatably connected to the distal link 114 of each leg, wherein each ground contacting assembly 126 comprises: a first element 136 and a pair of connecting rods 132-134, wherein each connecting rod comprises a distal end 244-246 each comprising a rod-end 248-250, a rod-end center 252-254, and a proximal end 144'-146' (corresponding proximal element 146', is not shown) wherein the distal end of the connecting rod is rotatably connected to the first element 236 by a angled connector 356-358, wherein the central axis of the angled connector (B1/B2) is at an angle of between 5° and 45° relative to the to a horizontal axis of the rod end center and a proximal end connected to said first joint 128 and rotating the ground contacting assembly 126 and providing abduction and adduction of each leg for traversing non-uniform terrain.

Rotating the ground contacting assembly through the expanded range of motion accessible due to the disclosed configuration of the central axis of the angled connector relative to the horizontal axis of the rod-end centers provides for methods of increasing the roll range of motion in the abduction direction in order to facilitate improved robot ambulation, stability and stance.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

What is claimed is:

1. A legged robot for traversing a terrain, comprising:
a robot body; and
at least two legs extending from the robot body wherein each leg comprises:
a plurality of rotatably connected links comprising at least a proximal link and a distal link; and
a ground contacting assembly rotatably connected to the distal link of each leg, wherein each ground contacting assembly comprises:
a first element; and
a pair of connecting rods, wherein each connecting rod comprises a rod-end and a proximal end, wherein each rod-end comprises:
a rod-end center; and the rod end centers define a horizontal axis through the first element, and
wherein the rod-ends are rotatably connected to the first element via an angled connector having a central axis, wherein the central axis is oriented at a coronal plane angle in the range of between 5° and 45° relative to the horizontal axis; and
said proximal end is connected to said leg, wherein said ground contacting assembly of the legged robot has a roll range of motion in the coronal plane for traversing said terrain.

2. The legged robot of claim 1, wherein said plurality of links are rotatably connected in an end to end manner.

3. The legged robot of claim 1, wherein said proximal end of said connecting rod is connected to said distal link of said leg.

4. The legged robot of claim 1, wherein said proximal end of said connecting rod is connected to an actuator.

5. The legged robot of claim 1, wherein said angled connector is selected from the group consisting of screws, studs, threaded studs, bolts, and fasteners.

6. The legged robot of claim 1, wherein the central axis of the angled connector is oriented at a coronal plane angle of 10° relative to the horizontal axis.

7. The legged robot of claim 1, wherein said ground contacting assembly has a roll range of motion that is greater in the abduction direction than an adduction direction.

8. The legged robot of claim 1, wherein said ground contacting assembly has a roll range of motion of about 55° in the coronal plane.

9. The legged robot of claim 1, wherein said rod-end rotates about 50° relative to the central axis of the angled connector.

10. The legged robot of claim 1, wherein the angled connector rotatable connects each of the pair of connecting rods to the first element at a first angle and a second angle wherein the first and the second angle are different angles within the range of between 5° and 45° relative to the horizontal axis.

11. The legged robot of claim 1, wherein the angled connector rotatable connects each of the pair of connecting rods to the first element at a first angle and a second angle wherein the first and the second angle are identical angles within the range of between 5° and 45° relative to the horizontal axis.

12. A ground contacting assembly comprising:
a first element; and
a pair of connecting rods, wherein each connecting rod comprises a rod-end and a proximal end, wherein each rod-end comprises:
a rod-end center; and the rod end centers define a horizontal axis through the first element, and
wherein the rod-ends are rotatably connected to the first element via an angled connector having a central axis, wherein the central axis is oriented at a coronal plane angle in the range of between 5° and 45° relative to the horizontal axis; and
said proximal end is connected to a leg of a robot wherein said ground contacting assembly is operable to provide abduction and adduction of said leg for traversing terrain.

13. The ground contacting assembly of claim 12, wherein said proximal end of said connecting rod is connected to a distal link of said leg.

14. The ground contacting assembly of claim 12, wherein the central axis of the angled connector is oriented at a coronal plane angle of 10° relative to the horizontal axis.

15. The ground contacting assembly of claim 12, wherein said ground contacting assembly has a roll range of motion of about 55° in the coronal plane.

16. The ground contacting assembly of claim 12, wherein said rod-end rotates about 50° relative to the central axis of the angled connector.

17. A legged robot for traversing a terrain, comprising:
a robot body; and
two legs extending from the robot body wherein each leg comprises:
a proximal link, an intermediate link, and a distal link; the proximal link having a first end rotatably connected to the body and a second end rotatably connected to the intermediate link at an intermediate link first end, the intermediate link having an intermediate second end rotatably connected to the distal link at a distal link first end; and
a ground contacting assembly rotatably connected to the distal link of each leg, wherein each ground contacting assembly comprises:
a first element; and
a pair of connecting rods, wherein each connecting rod comprises a rod-end and a proximal end, wherein each rod-end comprises:
a rod-end center; and the rod end centers define a horizontal axis through the first element, and
wherein the rod-ends are rotatably connected to the first element via an angled connector having a central axis, wherein the central axis is oriented at a coronal plane angle of 10° relative to the horizontal axis; and said proximal end is connected to said distal link, wherein said ground contacting assembly is operable to facilitate abduction and adduction of each said leg for traversing said terrain.

* * * * *